United States Patent
Heinz-Schwarzmaier et al.

(10) Patent No.: US 9,097,119 B2
(45) Date of Patent: Aug. 4, 2015

(54) TRANSITIONAL REGION FOR A SECONDARY COMBUSTION CHAMBER OF A GAS TURBINE

(71) Applicant: ALSTOM Technology Ltd, Baden (CH)

(72) Inventors: Thomas Heinz-Schwarzmaier, Wettingen (CH); Marc Widmer, Winterthur (CH); Selma Zahirovic, Basel (CH); Paul Marlow, Baden (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 0 days.

(21) Appl. No.: 13/668,274

(22) Filed: Nov. 4, 2012

(65) Prior Publication Data
US 2013/0055717 A1 Mar. 7, 2013

Related U.S. Application Data

(63) Continuation of application No. PCT/EP2011/056582, filed on Apr. 26, 2011.

(30) Foreign Application Priority Data

May 5, 2010 (CH) ........................................ 0691/10

(51) Int. Cl.
*F01D 9/00* (2006.01)
*F01D 9/02* (2006.01)
(Continued)

(52) U.S. Cl.
CPC .............. *F01D 9/023* (2013.01); *F01D 11/005* (2013.01); *F02C 6/003* (2013.01); *F05D 2240/127* (2013.01)

(58) Field of Classification Search
CPC ....... F01D 9/023; F01D 11/005; F02C 6/003; F05D 2240/127

USPC .................. 60/796–800, 39.37, 804, 774; 415/409.2, 409.3
See application file for complete search history.

(56) References Cited

U.S. PATENT DOCUMENTS 3,224,194 A * 12/1965 De Feo et al. .................. 60/793
3,965,066 A * 6/1976 Sterman et al. ................. 60/800
(Continued)

FOREIGN PATENT DOCUMENTS

DE 102006015530 A1 10/2007
EP 0924386 A1 6/1999
(Continued)

OTHER PUBLICATIONS

Russian Office Action dated May 13, 2014, issued by the Russian Patent Office in corresponding Russian Patent Application No. 2012152096/06(083052), and English language translation of Office Action. (11 pages).
(Continued)

*Primary Examiner* — Ted Kim
(74) *Attorney, Agent, or Firm* — Buchanan Ingersoll & Rooney PC (57) ABSTRACT

A gas turbine is provided having a secondary combustion chamber and a first guide vane row of a low-pressure turbine, the row being arranged directly downstream of the chamber. The radially outer boundary of the secondary combustion chamber is formed by at least one outer wall segment, which is secured on at least one support element arranged radially outwardly. The flow path of the hot gases is bounded radially outwardly, in the region of the guide vane row, by an outer platform which is secured at least indirectly on at least one guide vane support. A substantially radially extending gap-shaped cavity having a width in the range of 1-25 mm in the axial direction in the inlet region is arranged between the wall segment and the outer platform. At least one step element, which reduces the width by at least 10% in at least one step, extending substantially perpendicularly to the direction of flow of the hot gas in the cavity, is arranged in the inlet region.

16 Claims, 4 Drawing Sheets

(51) Int. Cl.
*F01D 11/00* (2006.01)
*F02C 6/00* (2006.01)

(56) References Cited

U.S. PATENT DOCUMENTS

| | | | |
|---|---|---|---|
| 6,082,961 A | 7/2000 | Anderson et al. | |
| 6,164,655 A | 12/2000 | Bothien | |
| 6,345,494 B1* | 2/2002 | Coslow | 60/799 |
| 6,347,508 B1* | 2/2002 | Smallwood et al. | 60/796 |
| 6,658,853 B2 | 12/2003 | Matsuda | |
| 7,527,469 B2 | 5/2009 | Zborovsky et al. | |
| 7,797,948 B2* | 9/2010 | Weaver et al. | 60/800 |
| 8,132,417 B2 | 3/2012 | Steiger et al. | |
| 8,206,093 B2 | 6/2012 | Irmisch | |
| 8,491,259 B2* | 7/2013 | Sutcu | 60/806 |
| 8,783,044 B2 | 7/2014 | Steiger et al. | |
| 2005/0172634 A1 | 8/2005 | Mukherjee | |
| 2006/0123797 A1* | 6/2006 | Zborovsky et al. | 60/800 |
| 2007/0033945 A1* | 2/2007 | Goldmeer et al. | 60/774 |
| 2009/0071167 A1* | 3/2009 | Benz et al. | 60/796 |
| 2009/0293488 A1 | 12/2009 | Coughlan, III | |

FOREIGN PATENT DOCUMENTS

| | | |
|---|---|---|
| EP | 1731711 A1 | 12/2006 |
| EP | 1731714 A1 | 12/2006 |
| JP | 62-176448 U | 11/1987 |
| WO | 2007068538 A1 | 6/2007 |
| WO | 2009/019282 A2 | 2/2009 |
| WO | 2009/083456 A2 | 7/2009 |

OTHER PUBLICATIONS

Notification of Reasons for Refusal issued by the Japanese Patent Office on Jan. 5, 2015, in corresponding Japanese Patent Application No. 2013-508432, and an English translation thereof.

* cited by examiner

TRANSITIONAL REGION FOR A SECONDARY COMBUSTION CHAMBER OF A GAS TURBINE

INCORPORATION BY REFERENCE

The following documents are incorporated herein by reference as if fully set forth: International Patent Application No. PCT/EP2011/056582, filed Apr. 26, 2011—and—Swiss Patent Application No. 00691/10, filed May 5, 2010.

FIELD OF INVENTION

The present invention relates to a gas turbine, in particular a transitional region between a secondary combustion chamber and a low-pressure turbine in a gas turbine.

BACKGROUND

Gas turbines can be provided with a single combustion chamber, but they can also have what is termed as sequential combustion. In the case of the latter, fuel is burned in a first combustion chamber, and the combustion air is then expanded via a first turbine, a high-pressure turbine. Downstream of the high-pressure turbine, the still hot combustion gases flow through a secondary combustion chamber, in which more fuel is fed in and typically burned in a process involving self-ignition. Arranged downstream of this secondary combustion chamber is a low-pressure turbine, by means of which the combustion gases are expanded, if appropriate followed by a heat recovery system with steam generation.

The transition of the housing from a combustion chamber to a turbine is a critical region here because the temperature and pressure conditions are particularly complex in this region. Typically, the secondary combustion chamber, which is normally designed as an annular combustion chamber, has, as it were, a shell-shaped outer boundary, an outer wall which is composed of a heat-resistant material or is correspondingly coated and which is normally constructed from individual segments. On the opposite, inner side, which is closer to the axis, there is a correspondingly designed inner boundary, an inner wall composed of corresponding materials. The low-pressure turbine, for its part, has a multiplicity of alternately arranged rows of guide vanes and rotor blades. The first row, which is arranged directly downstream of the secondary combustion chamber, is typically a guide vane row exhibiting a considerable twist of the vanes relative to the direction of the principal axis. In this case, the guide vanes are typically designed as segment modules, in which each guide vane has an inner platform on the inside and an outer platform on the outside, and the inner surfaces of these platforms then also form the radially inner and radially outer boundaries of the flow channel for the combustion air.

Accordingly, there is a gap on the radially inner side of the annular flow channel between the inner wall segment of the secondary combustion chamber and the inner platform of the first guide vane row, and a gap on the radially outer side between the outer wall segment of the secondary combustion chamber and the outer platform of the first guide vane row. For reasons of assembly and owing to the different mechanical and thermal loads on the components comprising the secondary combustion chamber and the turbine, this gap must have a certain width and cannot simply be closed or fully bridged. The problem with this gap, which forms a cavity that extends quite a long way radially towards the outside into other structural components of the housing, especially on the radially outer side, is the fact that it is furthermore exposed to complex flow conditions, especially in the region of each guide vane. This is because what is termed a bow wave or a "horse shoe vortex" is formed at the leading edge of the guide vanes, leading to hot combustion air being forced into this cavity in the wall region and penetrating to a corresponding depth into the latter. This can give rise to problems in connection not only with overheating but also with oxidation of the corresponding surfaces.

US 2009/0293488 discloses the possibility of substantially closing this transitional region by means of a very small gap dimension and additionally of providing specific structures which ensure optimum cooling of the wall regions in this region. However, the problem with this approach is that the required clearance between the combustion chamber module and the turbine is not automatically ensured as well, owing to the correspondingly small gap dimension.

SUMMARY

The present disclosure is directed to a gas turbine having a secondary combustion chamber and a first guide vane row of a low-pressure turbine, the row being arranged directly downstream of said chamber. A radially outer boundary of the secondary combustion chamber is formed by at least one outer wall segment, which is secured on at least one support element arranged radially outwardly. A hot gases flow path is bounded radially outwardly, in a region of the first guide vane row, by an outer platform which is secured at least indirectly on at least one guide vane support. A gap-shaped cavity having a width in the range of 1-25 mm in an axial direction in an inlet region, extends substantially radially between the at least one outer wall segment and the outer platform. At least one step element, which reduces said width by at least 10% in at least one step, extending substantially perpendicularly to the direction of the hot gas flow in the cavity, is arranged in the inlet region.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Introduction to the Embodiments

It is here that the present invention intervenes, taking a completely different approach to that of the prior art. More specifically, there will be no attempt to close the gap since this results in the abovementioned problems. On the contrary, although the gap will have a certain width (in the axial direction), appropriate measures will be taken to ensure that hot air or combustion air is prevented from readily entering said gap and potentially causing the abovementioned problems.

To be specific, the present invention accordingly relates to a gas turbine having a secondary combustion chamber and a first guide vane row of a low-pressure turbine, said row being arranged directly downstream of said chamber, wherein the radially outer boundary of the secondary combustion chamber is formed by at least one outer wall segment, which is secured on at least one support element arranged radially on the outside, wherein the flow path of the hot gases is bounded radially on the outside, in the region of the guide vane row, by an outer platform which is secured at least indirectly on at least one guide vane support, and wherein there is a substantially radially extending gap-shaped cavity having a width B in the range of 1-25 mm in the axial direction in the inlet region, between the wall segment and the outer platform. The width B is specified for the cold installation condition. Depending on the size of the housing clearances and permitted tolerances, the width B is in a range of 2-15 mm.

According to the invention, this gap is not closed or narrowed to an extreme extent as regards the gap dimension, at least in the inlet region; rather, the approach followed is such that at least one step element, which reduces said width B by at least 10% in at least one step extending substantially perpendicularly to the direction of flow of the hot gas in the cavity, is arranged in the inlet region.

This step element, which is arranged substantially directly behind the actual inlet region (typically 10-50 mm radially to the outside of the inlet gap), produces flow vortices which to a certain extent assume a sealing function and prevent the hot air from penetrating deep into the cavity. Thus, it is also important that the step should be able to produce such turbulence, and therefore the step is preferably designed as a single step which achieves the specified reduction of at least 10% in a single stage. Typically, the step has substantially right-angled transitional regions.

According to a first preferred embodiment, the step element is designed to encircle the axis of the turbine. Accordingly, the step element is designed substantially as an encircling rib arranged in the cavity, on one of the walls of the latter. It is possible for a single such step element to be arranged in the cavity but it is also possible for a plurality of such step elements to be provided in a manner radially offset towards the outside. Accordingly, it is possible to widen the cavity again behind the first step and to provide a second step element after said widening. Thus, two vortices are produced and an enhanced sealing function is ensured. If the width B of the cavity is sufficient, at least one further step element can be arranged on the wall of the cavity opposite the first step element. Typically, the step elements are situated opposite one another, giving rise to a constriction from both sides of the cavity.

Problems arise, in particular, in those regions which are arranged radially directly to the outside of the respective leading edge of each guide vane. In these regions, in particular, the combustion air made turbulent by the bow wave has a particularly strong tendency to penetrate into the cavity. The intermediate regions, in contrast, are less strongly affected. Accordingly, it is also possible, according to another preferred embodiment, for the step element to be designed as encircling segments, with one such segment being assigned radially on the outside to each guide vane (that is to say regions of the cavity that are situated between the segments do not have a step element). It is preferable if substantially all the segments have a length in the circumferential direction, based on the circumferential spacing p (pitch) of the guide vanes, of 30-50% of the circumferential spacing p.

By way of example, the step elements, designed as encircling segments, can be assigned symmetrically to the guide vanes (that is to say extending circumferentially by the same amount in the clockwise direction and in the counterclockwise direction from the radial position of the leading edge) or can be arranged offset with respect to the guide vanes in a manner corresponding to a radial offset of the bow wave.

Another preferred embodiment of the gas turbine proposed is characterized in that the step element is in the form of a rib which is mounted or formed on the wall region of the outer platform that adjoins the cavity and is substantially rectangular in axial cross section. Preferably, the rib has a length in the radial direction in the range of 10-100 mm, particularly preferably in the range of 20-50 mm. It is furthermore preferred if the rib is used in combination with a recess of equal or greater length, which is arranged radially on the outside, which is formed in this wall region and the radially outer end of which is formed by a further step, giving rise, radially in series, to two or three vortices and ensuring an enhanced sealing effect.

In general terms, it is preferred if the wall, which is situated opposite the step element, bounds the cavity and extends substantially perpendicularly to the axis of the turbine does not itself have a step element. In other words, in the present invention, it is preferentially not a matter of providing a labyrinth seal in the traditional sense, in which the flow path is as it were designed in a meandering shape; rather the point is to provide a step element on only one of the two opposite walls of the cavity. In fact, labyrinth seals can be problematic since they can restrict the clearance function of the gap and have a negative impact on ease of assembly.

In general terms, the step element or the plurality of segments, in which one step element is assigned to each guide vane, is preferably arranged on the wall situated downstream in the direction of flow of the hot gas in the secondary combustion chamber, i.e. normally on the platform.

According to another preferred embodiment, the outer platform is secured on the guide vane support by means of an intermediate ring, wherein a further wall region of the cavity, said wall region radially adjoining the wall region of the outer platform, is formed by this intermediate ring, and wherein furthermore a further step is formed, preferably at the transition between the wall region of the platform and the further wall region of the intermediate ring.

The cavity preferably also extends between the guide vane support and the support element, i.e. it is a cavity which extends deep into the structure.

According to another preferred embodiment of the invention, said width B is reduced by at least 20%, preferably by at least 30%, by the step (designed as a single step). Under specific conditions, a reduction by at least 40% may even be desirable. Typically, a reduction by up to 70% is desirable. Any reduction beyond this is generally not practicable and could furthermore have an effect on desired purging flows.

As already mentioned above, it is preferred if a step element is arranged only on the wall region of the outer platform and none on the opposite wall of the wall segment, said wall preferably being formed as a radially extending plane. An outer platform of this kind does not necessarily extend a long way radially towards the outside. In this case, this wall region on which the step element is arranged is then also not formed by the platform but is formed by the intermediate ring arranged to the outside or by the guide vane support.

It is preferable if the width of the cavity radially to the outside of the step element increases again substantially to the original width B in the inlet region, preferably via a step extending substantially perpendicularly to the direction of flow of the hot gas in the cavity, and, as a further preference, said step is followed in a radially outward direction by a second step, which once again narrows.

The width B in the inlet region is preferably in the range of 1-25 mm in the axial direction.

It is possible that an encircling projection, which locally narrows the inlet gap, is formed directly at the inlet gap leading to the cavity, on the wall of the outer wall segment.

DETAILED DESCRIPTION

Figure 1A:
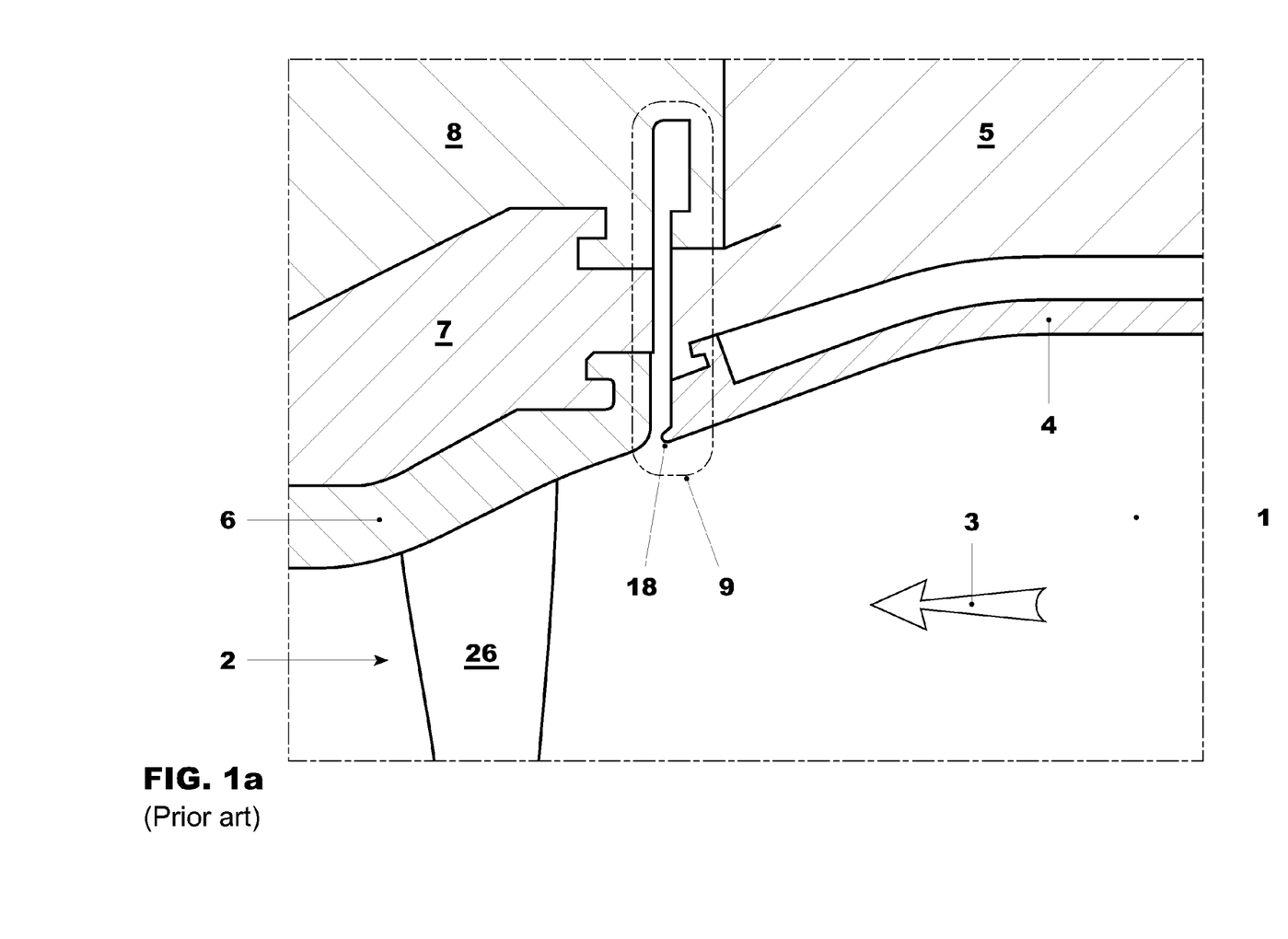
FIGS. 1a-1d in: in 1a), an axial section of the transitional region between the radial outer wall of the secondary combustion chamber and the outer platform of the first guide vane row of the low-pressure turbine, although the corresponding guide vane is not shown, in 1b), a detail view of the section shown in a) with illustrated hot air flows in the cavity, in 1c), a contour illustration of the cavity and, in 1d), a schematic illustration of the flow conditions in the inlet region of the cavity.

FIG. 1a shows an axial section through the radially outer wall region of a gas turbine having a secondary combustion chamber 1, at the transition from the secondary combustion chamber 1 to the first guide vane row 2 of the low-pressure turbine. The radially inner boundary of the flow channel for the hot gases 3 is not shown. Radially on the outside, the flow channel within the secondary combustion chamber 1 is formed by an outer wall segment 4. This is typically composed of metal or ceramic, and the metal is typically provided with a thermal protective coating. This outer wall segment 4 is secured on the housing by means of a support element 5 and is normally supplied at the rear with appropriate cooling air flows, which may additionally emerge into the hot air flow through cooling air openings in the wall segment 4 to give film cooling.

Downstream in the direction of flow of the hot gas 3, the secondary combustion chamber is followed by the first guide vane row 2. Guide vanes are typically integral structures which comprise not only the actual guide vane but also an inner platform and an outer platform 6 integrally formed thereon. The guide vanes can also be grouped into subassemblies comprising a plurality of guide vanes. The platforms, which cover a segment when viewed in a direction around the turbine axis, not only form the fastening of each of the guide vanes when a row of such guide vane elements is arranged around the circumference of a gas turbine, but simultaneously also form the radially outer boundary of the flow path for the hot gas in the case of the outer platform 6 and the inner boundary of said flow path in the case of the inner platform. In other words, the outer platforms 6 form an encircling ring which tapers in the direction of flow. The outer platforms 6 or said units of guide vanes and inner and outer platforms 6 are secured on what is termed an intermediate ring 7, which, for its part, is secured on the housing on what is termed a guide vane support 8 of the low-pressure turbine.

A gap is formed between the wall elements 4 of the secondary combustion chamber 1 and the outer platform 6 of the first guide vane row 2 of the low-pressure turbine, said gap forming a cavity 9 that extends deep into the housing components.

Figure 1B:
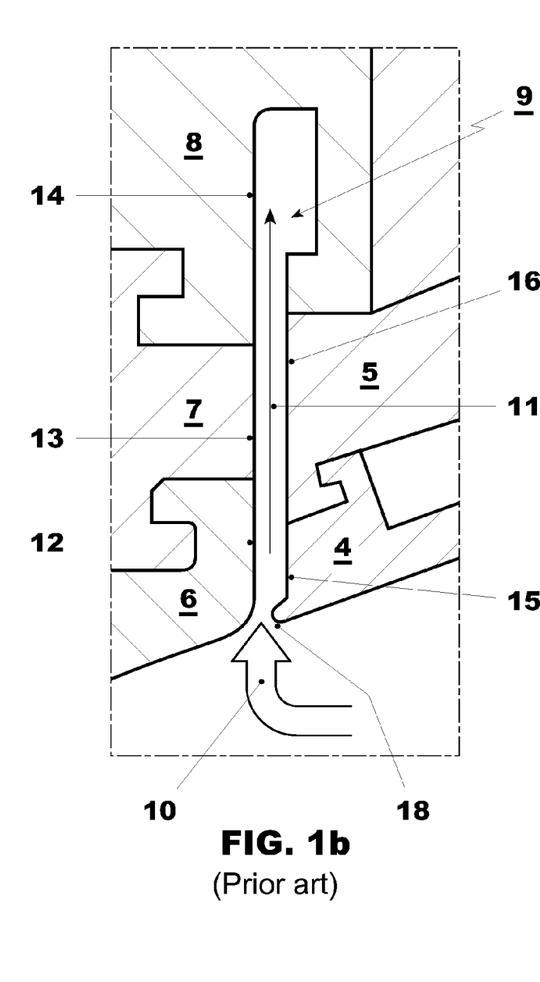

This cavity 9 is shown in greater detail in FIG. 1b. Owing to the bow wave, already described at the outset, at the leading edge of each guide vane, there is a high hot gas pressure in the inlet region of said cavity 9, especially at these radial positions. Accordingly, there is a hot gas flow, indicated schematically by the arrow 10, into this inlet region, penetrating deep into the cavity, as illustrated schematically by arrow 11. Here, the cavity 9 is initially formed on the downstream side (relative to the main direction of flow of the hot gases 3), by a wall region 12 of the outer platform 6, followed by a wall region 13 of the intermediate ring 7 and, further towards the outside radially, by a wall region 14 of the guide vane support 8. In the prior art design, these wall regions 12-14 lie substantially flush in one plane. The boundary wall of the cavity 9 which is arranged opposite and further upstream in the direction of flow is initially formed, radially on the inside, by the wall region 15 of the outer wall segment 4 of the secondary combustion chamber, followed, radially on the outside, by the wall region 16 of the support element 5 for the wall segment 4. Here as well, these wall regions 15, 16 are flush in the prior art designs. The hot air flow 11 not only has the effect that unnecessarily high temperatures are reached in the cavity but also leads, in particular, to oxidation problems in wall regions 12-16. On the other hand, this gap is necessary for assembly reasons.

Figure 1C:
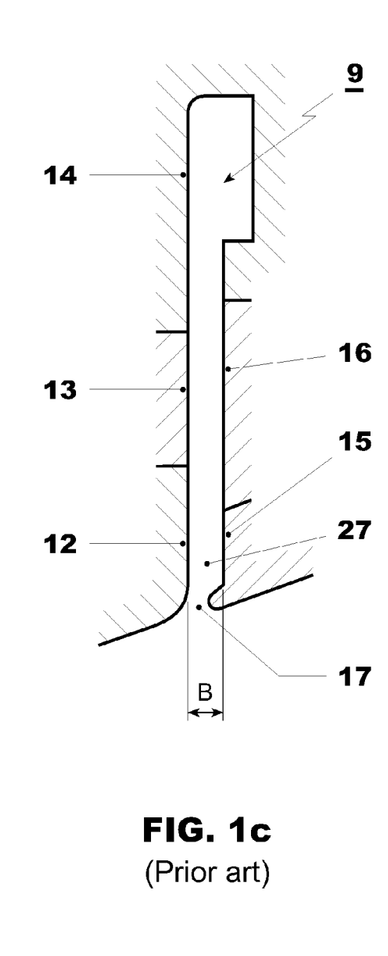

In the inlet region 27, this gap or cavity 9 has a width B, which is indicated in the contour illustration of the cavity 9 in FIG. 1c. This width is typically in the range of 1-25 mm, i.e. the gap is wide in this region and correspondingly accessible for said hot air flow. Directly at the inlet gap 17 leading into this cavity 9, there is an encircling projection 18 extending in the direction of flow of the hot gas from the outer wall segment 4, on the radially forward edge of the latter, said projection reducing the inlet or front inlet gap width somewhat. Behind this, however, the inlet gap widens again to said width B.

Figure 1D:
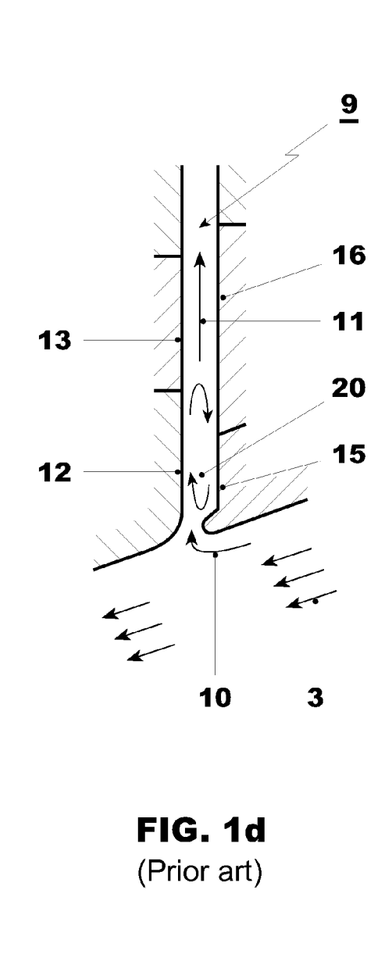

In the case of such a gap without special measures, the flow pattern which forms is as illustrated schematically in FIG. 1d. The hot gas passes through the inlet gap 17 and past the encircling projection 18 and forms a hot air vortex 20 behind said projection in the inlet region. Radially to the outside of this vortex, the hot gas then flows substantially unhindered in a radial direction and, accordingly, flows at high temperatures, i.e. with a high oxidative effect, deep into the gap of the cavity 9.

Figure 2A:
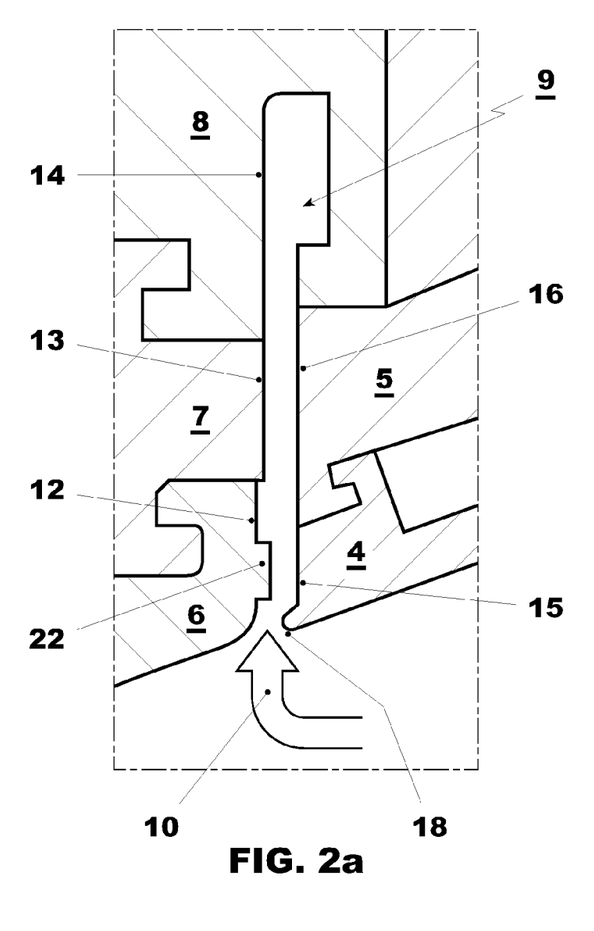
FIGS. 2a-2c show: in 2a), a detail view of a cavity with a step element, in 2b), a contour illustration of a cavity with a step element and, behind the latter, a set-back wall of the outer platform and, in 2c), a schematic illustration of the flow conditions in the inlet region of the cavity with a step element.

FIG. 2a shows a detail similar to FIG. 1b, which is additionally formed with a step element 22 according to the invention. This step element is designed as an encircling rib, which is arranged on the wall region 12 or is formed integrally with the latter and provides a radially inner step immediately downstream of the encircling projection 18 in the direction of flow of the hot gas 10. Typically, this step element 22 extends in a radial direction approximately over one third or even half the radial extent of the wall region 12. Apart from the encircling projection 18 in the inlet gap 17, the opposite wall 15, by contrast, is of flat configuration and is not likewise formed with a step element or with an appropriately corresponding groove. Accordingly, the step element 22 to a certain extent forms a barrier for the hot gas flow, and turbulence reduces the speed of the hot gas. Accordingly, leakage flows and purge air flows can then cool and protect the corresponding wall regions in a significantly more efficient manner. Both the step of the step element 22 which faces the inlet gap and the radially outer step behind the step element 22, where the cavity widens again, lead to vortex formation.

Figure 2B:
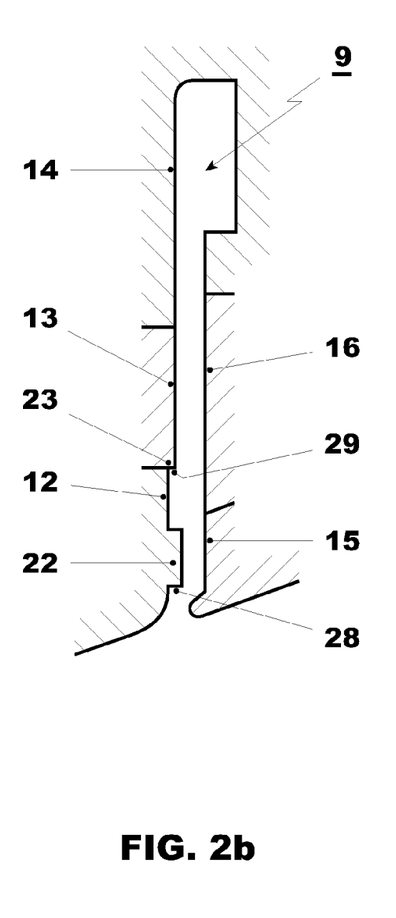

In the contour illustration shown in FIG. 2b, not only is the step element 22 additionally formed on the outer platform 6 but the wall region behind it is also cut out or recessed somewhat, with the result that the width is increased somewhat more than previously radially to the outside of the step element 22, and a pronounced step 29 is then also formed at the transition 23 to the wall region 13. This step 29 leads to additional turbulence and an expanded additional barrier function.

Figure 2C:
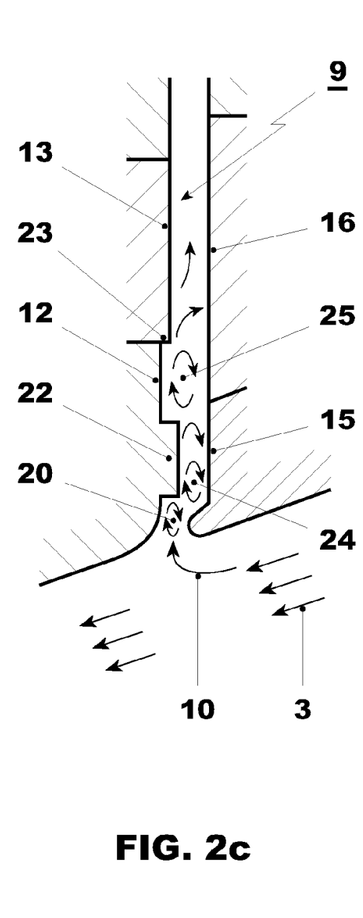

FIG. 2c illustrates schematically the flow conditions with such a construction. As before, there is a first vortex 20 essentially behind the encircling projection 18, but this is significantly intensified by the inlet step of the step element 22. In other words, this vortex is significantly more powerful than in FIG. 1 and also develops a greater barrier effect. In addition, a first vortex 24 is formed in the region of the step element 22. A second vortex 25 is formed to a certain extent at the radially outer end of the step element in the region where it widens, and these vortices 24, 25 lead to an additional barrier effect. Depending on the detailed geometry and purge air flow, an additional step 29 at the transition 23 promotes turbulence and leads to a further additional barrier function. If the temperatures are now observed, it will be ascertained that the temperature can be extremely reduced by these measures, not just in the region of the step element 22 but also radially to the outside thereof, with the result that lower pressures prevail and, accordingly, the regions arranged in the region of the step element 22 and radially to the outside thereof can be protected significantly more easily with cooling air.

Figure 3A:
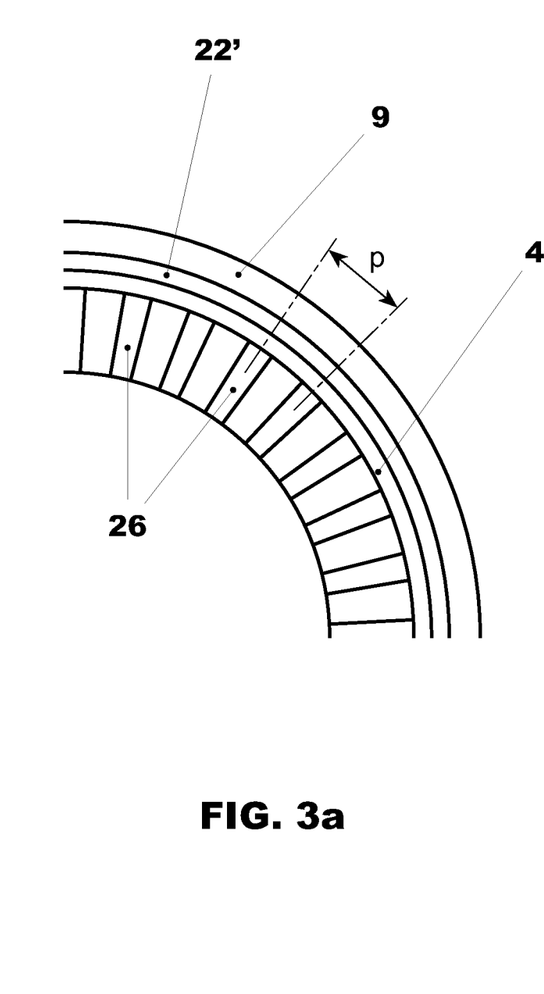
FIGS. 3a-3b show, in 3a), a schematic view, in a radial direction, of a segment of the cavity with an encircling step element and, in 3b), a corresponding view with a row of step element segments.
Figure 3B:
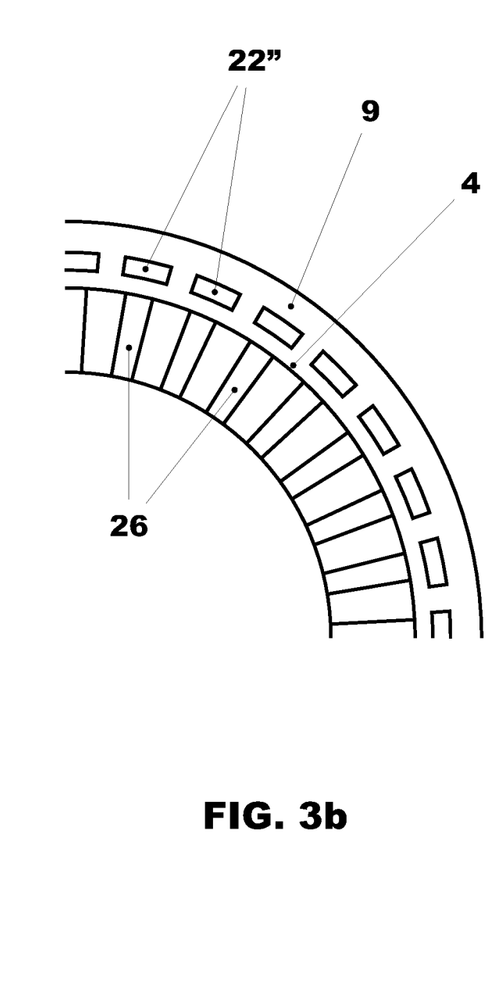

FIG. 3a illustrates how the step element 22' can be of encircling design, i.e. in the form of a substantially encircling ring around the axis of the low-pressure turbine. As already explained at the outset, those problems which are actually serious occur mainly at the leading edge of the respective guide vane 26. Accordingly, it may also be sufficient, as illustrated in FIG. 3b, if only a segment 22" of such a step element is arranged as it were radially to the outside of each guide vane and in a manner coordinated with the leading edge thereof in order to produce the effect according to the invention.

It is understood, therefore, that this invention is not limited to the particular embodiments disclosed, but is intended to cover all modifications which are within the spirit and scope of the invention as defined by the appended claims; the above description; and/or shown in the attached drawings.

LIST OF REFERENCE SIGNS 1 secondary combustion chamber
2 guide vane row
3 hot gas flow
4 outer wall segment of 1
5 support element for 4
6 outer platform of 26
7 intermediate ring
8 guide vane support of the low-pressure turbine
9 outer cavity
10 hot gas flow inlet in 9
11 hot gas flow in 9
12 wall region of 6 adjoining 9
13 wall region of 7 adjoining 9
14 wall region of 8 adjoining 9
15 wall region of 4 adjoining 9
16 wall region of 5 adjoining 9
17 inlet gap in 9
18 encircling projection
20 vortex in the inlet region
22 step element
22' step element, encircling
22" step element, in segments
23 step transition from 12 to 13
24 first vortex
25 second vortex
26 guide vane
27 inlet region of 9
28 first step on 22
29 step at 23
p pitch
B width in the inlet region

What is claimed is:

1. A gas turbine having a secondary combustion chamber and a first guide vane row of a low-pressure turbine, said row being arranged directly downstream of said chamber,
    wherein a radially outer boundary of the secondary combustion chamber is formed by at least one outer wall segment, which is secured on at least one support element arranged radially outwardly,
    wherein a hot gases flow path is bounded radially outwardly, in a region of the first guide vane row, by an outer platform which is secured at least indirectly on at least one guide vane support,
    wherein there is a substantially radially extending gap-shaped cavity having a width in the range of 1-25 mm in an axial direction in an inlet region, between the at least one outer wall segment and the outer platform, an encircling projection, which locally narrows the inlet gap, and which is formed at the inlet gap leading to the cavity, on the wall of the outer wall segment, at least one step element, which reduces said width by between 10% and 70% in at least one step, extending substantially perpendicularly to the direction of the hot gas flow in the cavity, is arranged in the inlet region and spaced downstream from the encircling projection, and
    wherein the at least one outer wall segment and the at least one support element form a boundary wall of the cavity, which extends substantially perpendicular to the axis of the turbine;
    wherein the at least one step element is situated opposite of the at least one outer wall segment.

2. The gas turbine as claimed in claim 1, wherein the at least one step element is configured to encircle the axis of the turbine.

3. The gas turbine as claimed in claim 1, wherein the at least one step element is configured as encircling segments, and one such segment is assigned radially outwardly to each guide vane, wherein all the segments have a length in a circumferential direction, based on a circumferential spacing of the guide vanes, of 30-50% of the circumferential spacing.

4. The gas turbine as claimed in claim 1, wherein the at least one step element is in the form of a rib which is mounted or formed on the wall region of the outer platform that adjoins the cavity, is substantially rectangular in axial cross section and has a length in the radial direction in the range of 10-100 mm.

5. The gas turbine as claimed in claim 1, wherein the at least one step element is in the form of a rib which is mounted or formed on a wall region of the outer platform that adjoins the cavity, is substantially rectangular in axial cross section and has a length in the radial direction in the range of 20-50 mm, and is formed in combination with a recess of equal or greater length, which is arranged radially outwardly, which is formed in said wall region and the radially outer end of which is formed by a further step.

6. The gas turbine as claimed in claim 5, wherein the outer platform is secured on the guide vane support by an intermediate ring, and wherein a further wall region of the cavity, said further wall region radially adjoining the wall region of the outer platform, is formed by said intermediate ring, and wherein a further step element is formed at the transition between the wall region of the platform and the further wall region of the intermediate ring.

7. The gas turbine as claimed in claim 1, wherein the cavity also extends between the guide vane support and the support element.

8. The gas turbine as claimed in claim 1, wherein the at least one step element reduces said width by between 20% and 70%.

9. The gas turbine as claimed in claim 1, wherein the at least one step element reduces said width by between 30% and 70%.

10. The gas turbine as claimed in claim 1, wherein the radially outwardly width of the at least one step element increases substantially to the original width in the inlet region, via a step extending substantially perpendicularly to the direction of flow of the hot gas in the cavity.

11. The gas turbine as claimed in claim 1, wherein the width in the inlet region is in a range of 2-15 mm in the axial direction.

12. The gas turbine as claimed in claim 1, comprising: the encircling projection, which locally narrows the inlet gap, is formed directly at the inlet gap leading to the cavity.

13. The gas turbine as claimed in claim 1, comprising:
at least one second step element spaced radially apart from the at least one step element, the at least one second step element arranged on an intermediate ring, which is secured to an outer platform segment.

14. The gas turbine as claimed in claim 13, wherein a wall region on the at least one outer platform segment between the at least one step element and the at least one second step element is recessed.

15. A gas turbine having a secondary combustion chamber and a first guide vane row of a low-pressure turbine, said row being arranged directly downstream of said chamber,
wherein a radially outer boundary of the secondary combustion chamber is formed by at least one outer wall segment, which is secured on at least one support element arranged radially outwardly,
wherein a hot gases flow path is bounded radially outwardly, in a region of the first guide vane row, by an outer platform which is secured at least indirectly on at least one guide vane support,
wherein there is a substantially radially extending gap-shaped cavity having a width in the range of 1-25 mm in an axial direction in an inlet region, between the at least one outer wall segment and the outer platform, at least one step element, which reduces said width by between 10% and 70% in at least one step, extending substantially perpendicularly to the direction of the hot gas flow in the cavity, is arranged in the inlet region, and
wherein the at least one step element is configured as encircling segments, and one such segment is assigned radially outwardly to each guide vane, wherein all the segments have a length in a circumferential direction, based on a circumferential spacing of the guide vanes, of 30-50% of the circumferential spacing.

16. A gas turbine having a secondary combustion chamber and a first guide vane row of a low-pressure turbine, said row being arranged directly downstream of said chamber,
wherein a radially outer boundary of the secondary combustion chamber is formed by at least one outer wall segment, which is secured on at least one support element arranged radially outwardly,
wherein a hot gases flow path is bounded radially outwardly, in a region of the first guide vane row, by an outer platform which is secured at least indirectly on at least one guide vane support,
wherein there is a substantially radially extending gap-shaped cavity having a width in the range of 1-25 mm in an axial direction in an inlet region, between the at least one outer wall segment and the outer platform, an encircling projection, which locally narrows the inlet gap, and which is formed at the inlet gap leading to the cavity, on the wall of the outer wall segment,
at least one step element, which reduces said width by between 10% and 70% in at least one step, extending substantially perpendicularly to the direction of the hot gas flow in the cavity, is arranged in the inlet region and spaced downstream from the encircling projection, and
wherein the at least one step element is situated opposite of the at least one outer wall segment.

* * * * *